United States Patent
Iyer et al.

(10) Patent No.: US 10,101,577 B2
(45) Date of Patent: Oct. 16, 2018

(54) SYSTEM TO PROGNOSE GAS TURBINE REMAINING USEFUL LIFE

(71) Applicant: Siemens Energy, Inc., Orlando, FL (US)

(72) Inventors: Arun Meenakshinatha Iyer, Charlotte, NC (US); Anand A. Kulkarni, Charlotte, NC (US); Kevin Licata, Belmont, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 219 days.

(21) Appl. No.: 14/684,471

(22) Filed: Apr. 13, 2015

(65) Prior Publication Data

US 2016/0301880 A1    Oct. 13, 2016

(51) Int. Cl.
| | |
|---|---|
| H04N 5/33 | (2006.01) |
| H04N 7/18 | (2006.01) |
| G02B 23/24 | (2006.01) |
| G01J 5/04 | (2006.01) |
| G01J 5/08 | (2006.01) |
| G01J 5/00 | (2006.01) |

(52) U.S. Cl.
CPC ........ *G02B 23/2492* (2013.01); *G01J 5/0088* (2013.01); *G01J 5/041* (2013.01); *G01J 5/0818* (2013.01); *G01J 5/0896* (2013.01); *G02B 23/24* (2013.01); *G01J 2005/0077* (2013.01); *G02B 23/2453* (2013.01)

(58) Field of Classification Search
None
See application file for complete search history.

(56) References Cited

U.S. PATENT DOCUMENTS

| | | | | |
|---|---|---|---|---|
| 3,794,929 A | * | 2/1974 | Carr ...................... | H01S 3/0604 359/333 |
| 5,095,252 A | * | 3/1992 | Kurth ..................... | H05B 41/34 315/200 A |

(Continued)

FOREIGN PATENT DOCUMENTS

| | | |
|---|---|---|
| CN | 102954968 A | 3/2013 |
| JP | 2004156580 A | 6/2004 |

(Continued)

*Primary Examiner* — Mohammad J Rahman

(57) ABSTRACT

A flash thermography device for generating an infrared image of a turbine component located inside a turbine, wherein the turbine includes at least one inspection port. The device includes a flash source that generates a light pulse that heats the turbine component and an infrared sensor for detecting thermal energy radiated by the turbine component. The device also includes a borescope having a sensor end, a viewing end that includes the flash source and an interior hollow that extends between the sensor and viewing ends. The borescope is positioned in the inspection port such that the viewing end is located inside the turbine. Thermal energy radiated from the turbine component is transmitted through the hollow to the infrared sensor to enable generation of the infrared image. The device further includes a reflector located on the viewing end that directs the light pulse toward the turbine component and a flash power supply for energizing the flash source.

26 Claims, 6 Drawing Sheets

(56) References Cited

U.S. PATENT DOCUMENTS

| | | | | |
|---|---|---|---|---|
| 5,155,352 | A * | 10/1992 | Kim | H01T 2/00 |
| | | | | 250/214.1 |
| 5,262,657 | A * | 11/1993 | Kim | H01L 31/08 |
| | | | | 250/214.1 |
| 5,280,168 | A * | 1/1994 | Kim | H03K 17/78 |
| | | | | 250/214.1 |
| 6,004,487 | A * | 12/1999 | Wada | B23K 26/0084 |
| | | | | 219/121.75 |
| 7,186,981 | B2 * | 3/2007 | Shepard | G01N 25/72 |
| | | | | 250/338.1 |
| 9,857,227 | B1 * | 1/2018 | Boudin | G01N 25/72 |
| 9,964,404 | B2 * | 5/2018 | Ouyang | G01B 21/085 |
| 2005/0056786 | A1 * | 3/2005 | Shepard | G01N 25/72 |
| | | | | 250/341.4 |
| 2007/0036199 | A1 * | 2/2007 | Ouyang | G01B 21/085 |
| | | | | 374/120 |
| 2009/0201971 | A1 * | 8/2009 | Goldammer | G01B 21/085 |
| | | | | 374/45 |
| 2010/0178046 | A1 * | 7/2010 | Moon | F21L 4/02 |
| | | | | 396/155 |
| 2014/0123624 | A1 * | 5/2014 | Minto | F23N 5/18 |
| | | | | 60/39.281 |
| 2014/0267694 | A1 | 9/2014 | Henderkott et al. | |
| 2015/0085895 | A1 * | 3/2015 | Howard | G01N 25/72 |
| | | | | 374/5 |
| 2015/0122998 | A1 * | 5/2015 | Koonankeil | F01D 5/005 |
| | | | | 250/338.3 |
| 2015/0369596 | A1 * | 12/2015 | Ouyang | G01J 5/0088 |
| | | | | 374/121 |
| 2016/0054219 | A1 * | 2/2016 | Blaha | G01N 33/0057 |
| | | | | 250/338.1 |
| 2016/0114887 | A1 * | 4/2016 | Zhou | B60F 5/02 |
| | | | | 348/148 |
| 2016/0258827 | A1 * | 9/2016 | Stadlbauer | G01L 1/241 |
| 2016/0318135 | A1 * | 11/2016 | Raulerson | F01D 5/005 |
| 2017/0359530 | A1 * | 12/2017 | Boudin | H04N 5/2256 |

FOREIGN PATENT DOCUMENTS

| | | |
|---|---|---|
| WO | 2014078305 A1 | 5/2014 |
| WO | 2014198251 A1 | 12/2014 |

* cited by examiner

SYSTEM TO PROGNOSE GAS TURBINE REMAINING USEFUL LIFE

FIELD OF THE INVENTION

This invention relates to flash thermography devices used in connection with turbines, and more particularly, to a flash thermography device that includes a borescope that is positioned in an inspection port of a turbine such that a viewing end of the device is delivered inside the turbine to enable generation of an infrared image of a hot gas path component located inside a turbine.

BACKGROUND OF THE INVENTION

In various multistage turbomachines used for energy conversion, such as gas turbines, a fluid is used to produce rotational motion. Referring to FIG. 1, an axial flow gas turbine 10 includes a compressor section 12, a combustion section 14 and a turbine section 16 arranged along a horizontal center axis 18. The compressor section 12 provides a compressed air flow to the combustion section 14 where the air is mixed with a fuel, such as natural gas, and ignited to create a hot working gas. The turbine section 16 includes a plurality of turbine blades 20 arranged in a plurality of rows. The hot gas expands through the turbine section 16 where it is directed across the rows of blades 20 by associated stationary vanes 22. The blades 20 are each configured as a blade assembly that is attached to a shaft that is rotatable about the center axis 18. As the hot gas passes through the turbine section 16, the gas causes the blades 20 and thus the shaft to rotate, thereby providing mechanical work. Each row of blades 20 and associated vanes 22 form a stage. In particular, the turbine section 16 may include four rows of blades 20 and associated vanes 22 to form four stages. The gas turbine 10 further includes an exhaust cylinder section 24 located adjacent the turbine section 16 and an outer diffuser section 26 located adjacent the exhaust cylinder section 24.

The blades or airfoils 20 and vanes 22 are directly exposed to the hot gases as the gases pass through the axial gas turbine 10. Blades 20 and vanes 22 in the turbine section 16 are typically provided with internal cooling circuits that guide a coolant, such as compressor bleed air, through them to locally impinge on their internal metal surfaces, thus providing sufficient cooling to ensure part life. In certain scenarios, these cooling circuits may ultimately exit into the gas path through various film cooling holes that are formed on the surface of airfoil. The air is then discharged to the outside of the airfoil to form a film of air that cools and protects the airfoil from hot gases. Film cooling effectiveness is related to the concentration of film cooling fluid at the surface being cooled, the shape of the holed and other factors. In general, the greater the cooling effectiveness, the more efficiently the surface can be cooled. An increase in cooling effectiveness causes greater amounts of cooling air to be used in order to maintain a desired cooling capacity, which may cause a decrease in engine efficiency.

In addition, sections of the turbine 10 that form a hot gas path may include a ceramic-based coating that serves to minimize exposure of the base metal of a component, such as an airfoil base metal, to high temperatures that may lead to oxidation of the base metal. Such a coating may be a known thermal barrier coating (TBC) that is applied onto a bond coating (BC) formed on the base metal.

During operation of the turbine 10, the cooling holes may become clogged or blocked. This compromises ability to cool an airfoil surface, which may lead to undesirable base metal overheating. Moreover, spallation and/or delamination of the TBC layer or both the TBC and BC layers may occur during operation of the turbine. This also exposes the base metal to high temperatures, which may lead to oxidation of the base metal. Spallation and/or delamination may also affect cooling hole geometry and thus effectiveness of the cooling holes.

A turbine 10 is typically operated for extended periods and is inspected at periodic intervals to check for wear, damage and other undesirable conditions that may have occurred with respect to various internal components. For example, the cooling holes are inspected to determine if any are blocked. In addition, the TBC/BC layers are inspected to determine the degree of spallation and/or delamination of the TBC/BC layers (i.e. remaining thickness of the layers) and other undesirable conditions. In order to inspect components within the turbine 10, the turbine 10 is shut down and allowed to cool down, which takes a substantial amount of time. An inspection/evaluation team must then remove hardware from the turbine 10, such as an outer casing, in order to gain access to a turbine component (for example, a stage 1 or stage 2 vane or blade). The turbine component is then removed and may be sectioned in order to be able to visually inspect the cooling holes and/or the TBC and BC layers. Ultimately, the sectioned turbine component is replaced with a new turbine component. However, the current procedure is labor intensive, time consuming and expensive.

SUMMARY OF INVENTION

A flash thermography device for generating an infrared image of a turbine component located inside a turbine is disclosed, wherein the turbine includes at least one inspection port. The device includes a flash source that generates a light pulse that heats the turbine component and an infrared sensor for detecting thermal energy radiated by the turbine component. The device also includes a borescope having a sensor end, a viewing end and an interior hollow that extends between the sensor and viewing ends. The sensor end is located adjacent the infrared sensor and the viewing end includes the flash source. The borescope is positioned in the inspection port such that the viewing end is located inside the turbine. Thermal energy radiated from the turbine component is transmitted through the hollow to the infrared sensor to enable generation of the infrared image. The device further includes a reflector located on the viewing end that directs the light pulse toward the turbine component and a flash power supply for energizing the flash source. In particular, the device generates infrared images of a turbine component that provide sufficient detail of internal features of the turbine component and bond/thermal barrier coatings formed on the component without the need for removing the component from the turbine or sectioning the component.

In addition, a method is disclosed for generating an infrared image of a turbine component located inside a turbine, wherein the turbine includes at least one inspection port. The method includes providing a flash source that generates a light pulse that heats the turbine component. The method also includes providing an infrared sensor for detecting thermal energy radiated by the turbine component. In addition, a borescope is provided that includes a viewing end and an interior hollow that extends to the infrared sensor. The borescope is inserted into the inspection port so as to locate the viewing end inside the turbine. Further, the method includes transmitting thermal energy radiated from the turbine component through the hollow to the infrared sensor to enable generation of the infrared image.

BRIEF DESCRIPTION OF DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
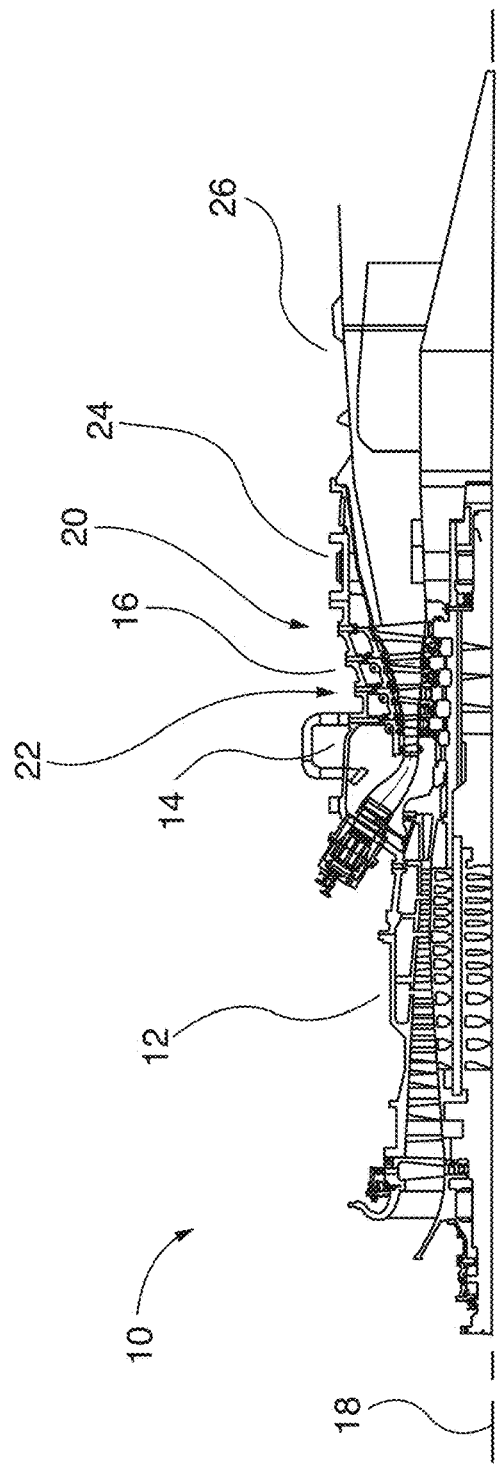
FIG. 1 is a partial view an axial flow gas turbine.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
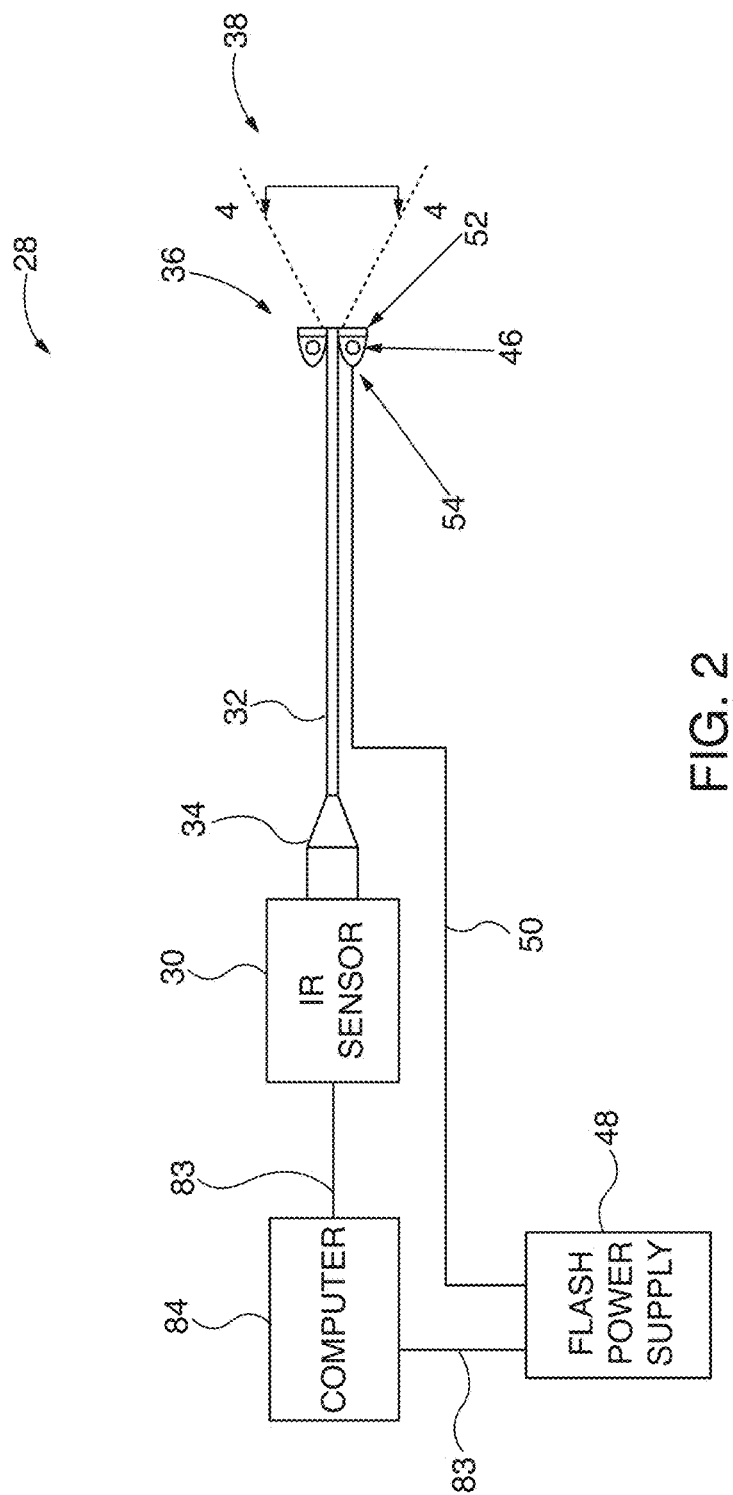
FIG. 2 depicts a flash thermography device in accordance with an embodiment of the invention.
Figure 3:
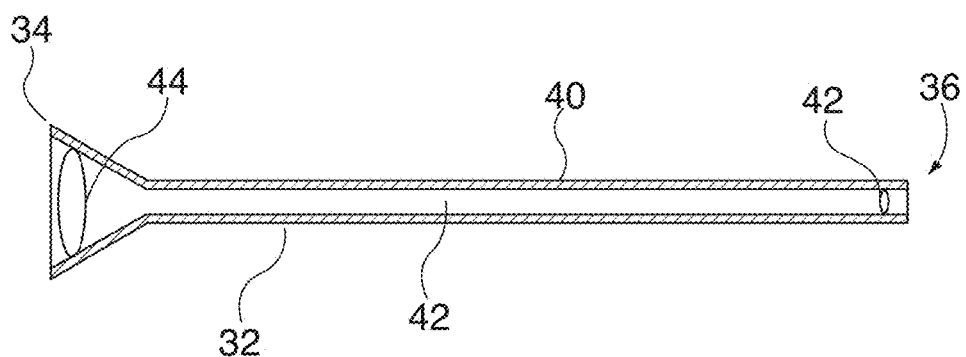
FIG. 3 is a cross sectional side view of a borescope of the device.

Referring to FIG. 2 a flash thermography device 28 in accordance with an embodiment of the invention is shown. The device 28 includes an infrared (IR) sensor 30 for detecting thermal energy in the infrared region of the electromagnetic spectrum. In an embodiment, the IR sensor 30 is an IR camera such as a digital single lens reflex (D-SLR) camera although it is understood that other types of IR sensors may be used. The device 28 also includes a borescope 32 having a sensor end 34 that is attached to the IR sensor 30 and a viewing end 36 that provides a field of view 38 for the IR sensor 30. Referring to FIG. 3, a cross sectional side view of the borescope 32 is shown. The borescope 32 includes a rigid tube 40 having an interior hollow portion 42 that extends through the tube 40 between the sensor end 34 and the viewing end 36. A first lens 42 is located in the viewing end 36 and a second lens 44 at the sensor end 34 that is adjacent the IR sensor 30. In an embodiment, the first 42 and second lenses 44 are each objective lenses although it is understood that other types of lenses may be used. Further, the first lens 42 may be a different type of lens than the second lens 44. In an alternate embodiment, the tube 40 is flexible.

Referring back to FIG. 2, a flash source 46 that provides a high intensity light pulse is located on the viewing end 36 of the borescope 32. In an embodiment, the flash source 46 is a flash tube although it is understood that other types of flash sources may be used. The flash source 46 is energized by a flash power supply 48 via an electrical connection 50 that may include wires or cables. In an embodiment, the flash power supply 48 has power rating of approximately 1000 to 5000 joules. When energized, the flash source 46 emits a high intensity light pulse across a work piece that serves to heat the work piece. A portion of the thermal energy radiated by the work piece is then transmitted through the first lens 42, the hollow portion 42 and second lens 44 and is detected by the IR sensor 30. The borescope 32 includes an IR filter 52 located on the viewing end 36 to enable detection by the IR sensor 30 of thermal energy that is in the middle infrared region of the electromagnetic spectrum. The IR sensor 30 is configured to generate IR images of the work piece based on the radiated thermal energy. The IR sensor 30 may also be configured to obtain image data at other frequencies in addition to or in place of the infrared region of the electromagnetic spectrum. Further, the borescope 32 may include a reflector 54 located on the viewing end 36 for directing and concentrating the light pulse in a desired direction toward the work piece.

Figure 4:
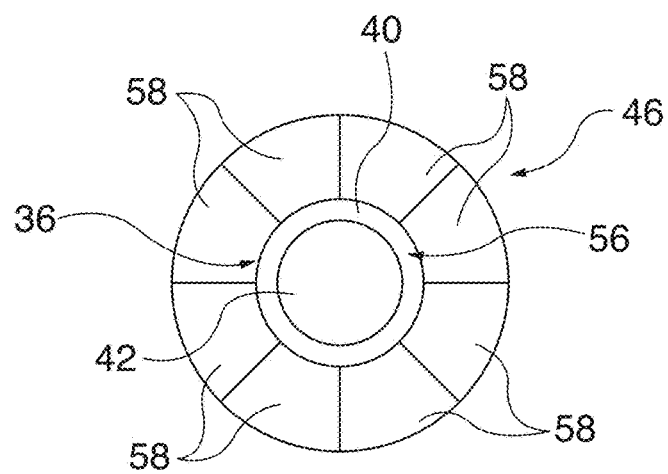
FIG. 4 depicts a viewing end of the borescope along view line 4-4 of FIG. 3.

Referring to FIG. 4, a view of the viewing end 36 of the borescope 32 along view line 4-4 of FIG. 3 is shown. The flash source 46 may have an annular shape including a central aperture 56 that receives the viewing end 36. In an alternate configuration, the flash source 46 may be comprised of a plurality of annular sectors 58. It is understood that other types of flash sources may be used such as white light emitting diodes.

Figure 5:
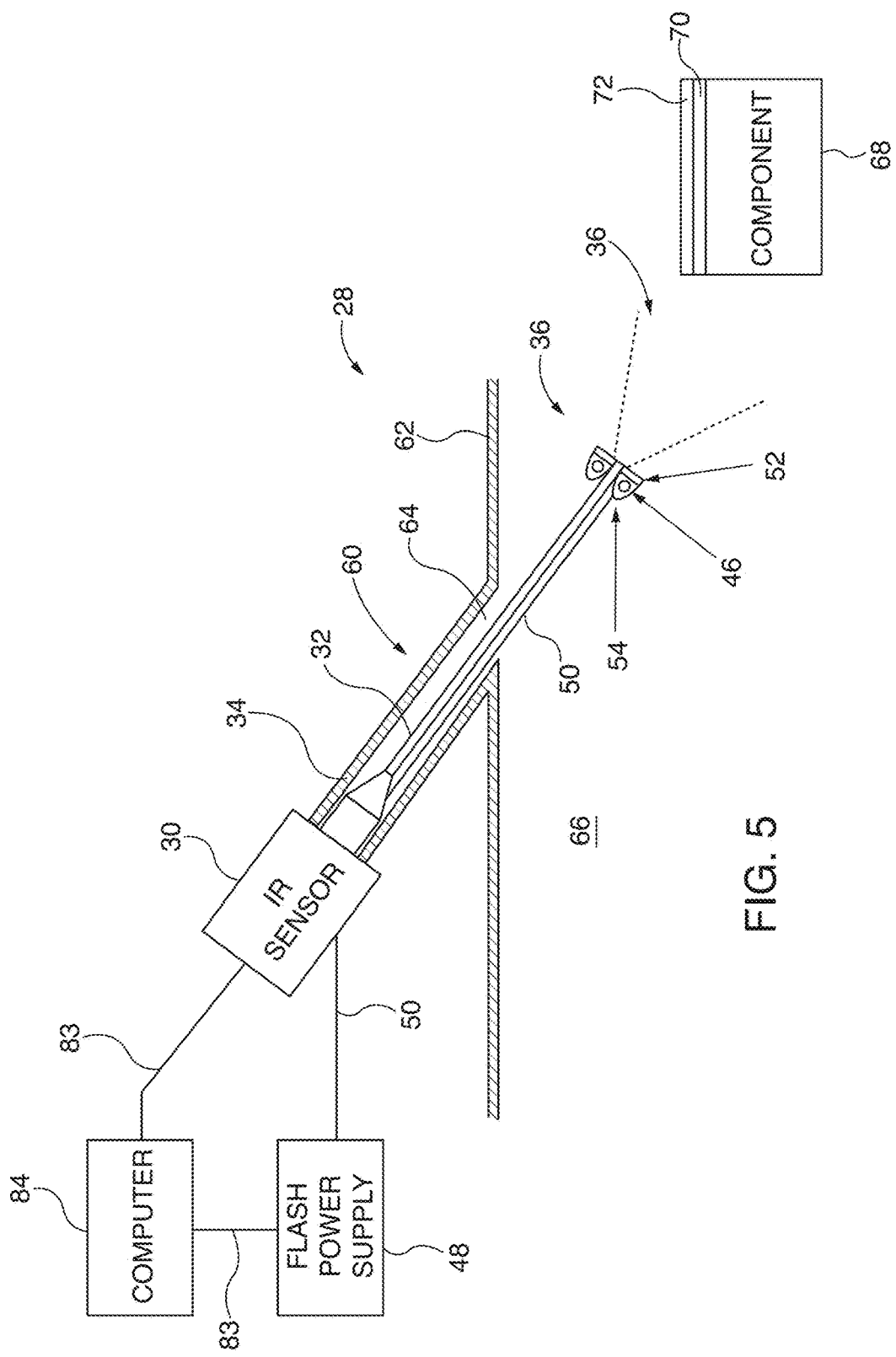
FIG. 5 is a partial cross sectional view of an exemplary inspection port.

A turbine includes a plurality of inspection ports located about a turbine periphery or outer casing. The inspection ports are positioned to enable inspection of various internal components and areas of the turbine without removal of an outer casing or covering of the turbine. By way of example, the inspection ports are located to enable inspection of combustors, transitions, transition exit mouth, row 1 vanes and blades and row 2 blades of a turbine. Referring to FIG. 5, a partial cross sectional view of an exemplary inspection port 60 is shown. The port 60 may be preexisting port or a new port formed in an outer casing 62 of a turbine 10. The port 60 includes a through hole 64 that provides access to an interior 66 of the turbine 10. In an alternate embodiment, a plurality of inspection ports 60 may be used. For example, the inspection ports 60 may be located in a circumferential and/or staggered arrangement around the outer casing 62. In accordance with embodiments of the invention, the borescope 32 is inserted into the inspection port 60. In order to obtain an IR image of a component 68 such as an airfoil 20, the flash source 46 is energized by the flash power supply 48 thereby causing the flash source 46 to emit a light pulse that heats the component 68. A portion of the thermal energy radiated by the component 68 is then detected by the IR sensor 30. The IR sensor 30 generates IR images of the component 68 based on the thermal energy radiated by the component 68. Thus, IR images may be captured without removal of an outer casing 62 or other disassembly of the turbine 10 to gain access to the component 68. Further, the IR images may be obtained in situ, i.e. without having to remove the component 68 to be imaged from the turbine 10, which results in substantial time savings. In an embodiment, the component 68 may be a hot gas path component such as a combustor, transition, vane 22, blade 20 or associated component.

It has been found by the inventors herein that IR images of a component 68 obtained by the device 28 provide sufficient detail of the internal features of the component 68 to enable evaluation by an inspection/evaluation team without the need for sectioning the component 68. Further, the device 28 generates IR images having sufficient detail to enable determination of a thickness of a BC 70 or TBC 72 layer formed on the component 68. Therefore, the current invention enables nondestructive evaluation (NDE) of turbine components.

A turbine 10 is typically inspected at periodic intervals at which time the turbine is shut down. The device 28 enables the capturing of IR images of components 68 before the components 68 have cooled down, which results in further time savings. In particular, the flash source 46 sufficiently heats a desired component 68 so as to enable detection of radiated thermal energy by the IR sensor 30 while the component 68 is still relatively hot. In an embodiment, IR images may be taken within approximately five minutes of turbine shut down. Further, capturing an IR image takes relatively little time, for example, approximately five seconds.

Figure 6:
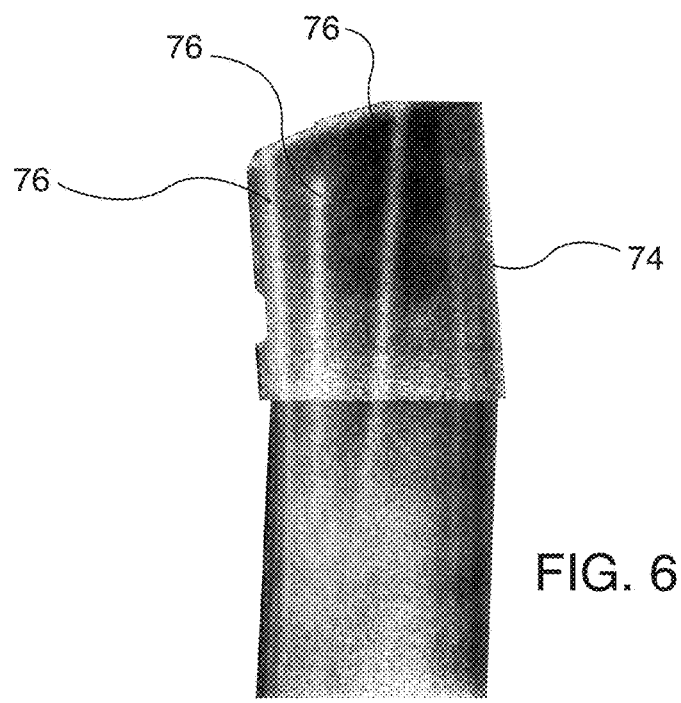
FIG. 6 depicts an infrared image of a stage 2 turbine blade that depicts internal cooling channels of the blade.
Figure 7:
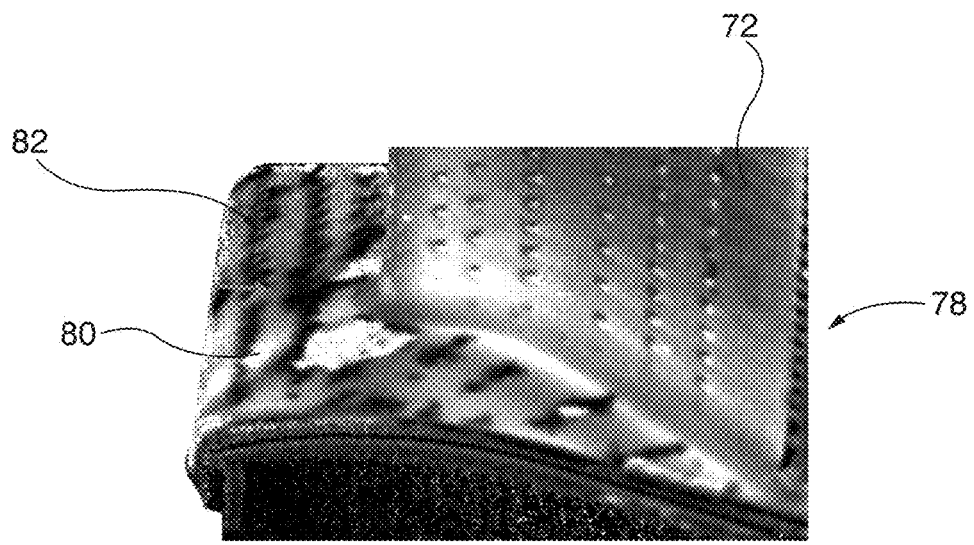
FIG. 7 depicts an infrared image of a thermal barrier coating layer for a stage 1 vane.

By way of example, FIG. 6 depicts an IR image of a stage 2 blade 74 that reveals internal cooling channels 76 of the blade 74. In addition, an IR image may be captured of a TBC layer 72 on stage 1 and stage 2 blades and/or stage 1 and stage 2 vanes that enables determination of the degree of spallation and/or delamination of the TBC layer 72. Referring to FIG. 7, an IR image of a TBC layer 72 for a stage 1 vane 78 is shown. Region 80 shows delamination of the TBC layer 72 that has occurred near cooling holes 82. FIG. 7 serves as a tomographic image that depicts the depth of the TBC layer 72. The device 28 enables a determination of the thickness of the BC 70/TBC 72 layers by an inspection/evaluation team to assess the extent of any chipping of the BC 70/TBC 72 layers that may have occurred. In particular, the disclosure of U.S. Pat. No. 7,769,201 is hereby incorporated by reference in its entirety.

If the BC 70/TBC 72 layers are acceptable, the turbine 10 is returned to service/operation without waiting for a time consuming cool down period and disassembly of the turbine 10. If there is significant damage to the BC 70/TBC 72 layers, the inspection/evaluation team can quickly make a decision to call for maintenance in order to avoid damage of a turbine component due to loss of BC 70/TBC 72 layers.

For example, a duration of the light pulse emitted by the flash source 46 is between approximately 2 to 15 milliseconds depending on the thickness of a BC 70 or TBC 72 layer. The length of time used for detecting the radiated thermal energy (i.e. signal collection time) is dependent upon the characteristics of the component 68 that is being imaged. With respect to BC 70/TBC 72 layers for example, the signal collection time for a thick coating (i.e. a thickness of approximately 600 μm to 2 mm) is longer than that for a thin coating (i.e. a thickness of approximately 150 μm to 600 μm). In an embodiment, the signal collection time for a thin coating when using an approximately 2 millisecond duration light pulse is approximately 2 seconds. The signal collection time for a thick coating when using an approximately 15 millisecond duration light pulse is approximately 15 seconds.

The device 28 may also be used to capture IR images of cooling holes of an airfoil 20 or vane 22. During operation, the cooling holes of an airfoil 20 may become clogged due to compressor inlet debris that is drawn downstream into the turbine 10. By viewing an IR image of the cooling holes, the inspection/evaluation team can quickly assess the extent of any clogging of the cooling holes (i.e. whether the cooling holes are partially or fully clogged) and any impact that clogging would have upon continued operation of the turbine. In addition, the IR images may be used to generate three dimensional views of a cooling hole.

IR images may also be captured of stationary turbine components. For example, an IR image may be obtained of coated stationary turbine components including hot gas path components such as stage 1 or stage 2 vanes, transition piece and others. This enables evaluation or estimation of turbine characteristics such as back flow margin and the modulation of cooling flows. In particular, the turbine 10 may have been conservatively designed such that an initial level of cooling flow exceeds the level that is needed for sufficient cooling. The current invention may then be used to estimate back flow margin soon after shutdown without waiting for a cool down period to enable adjustment of cooling flow and improve turbine performance for future turbine operation. Further, an IR image may be obtained of coated rotating components such as hot stage 1 or stage 2 blades soon after a turbine shut down and without waiting for a cool down period. Impingement pressure ratios, which are indicative of base metal temperature changes of critical turbine components such as hot gas path components, may also be estimated soon after a turbine shutdown and without waiting for a cool down period. This provides an opportunity for extending at least one service interval for the turbine 10 if the degree of deterioration of a turbine component is less than anticipated. Moreover, operation of the turbine 10 may be extended beyond nominal or expected limits due to the current invention, thus enabling extended service intervals with customers. In addition, the current invention enables forecasting or estimation of a remaining useful life of turbine components and TBC/BC layers without waiting for a cool down period and without disassembly of a portion of the turbine 10 such as turbine shell cover. Further, a firing temperature for the turbine 10 may be increased during operation of the turbine 10 based on an inspection of IR images of the turbine components, thus improving efficiency and power output. The current invention also enables monitoring of TBC/BC thickness/delamination levels which in turn enables prediction of whether the turbine 10 is able to withstand a level of chipping in the TBC/BC layers that may occur by estimation of base metal temperature. Information such as back flow measurement, pressure ratio and others may also be sent to a design team in real time to enable evaluation of current turbine cooling design and investigate possible design changes for improving efficiency and performance of the turbine. Further, IR images of turbine components may be captured during operation of the turbine.

Figure 8:
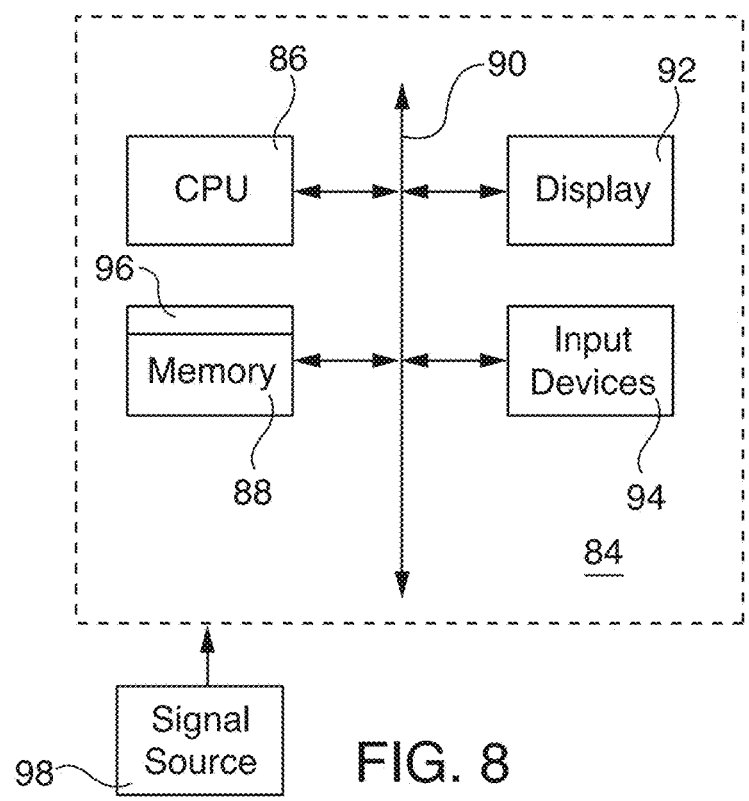
FIG. 8 is a block diagram of a computer.

Referring back to FIG. 2, the IR sensor 30 and flash power supply 48 are communicatively coupled to a computer 84 by a wired connection 83 or a wireless connection. The computer 84 includes software and drivers for controlling operation of the IR sensor 30, flash power supply 48 and flash source 46. The computer 84 may use well-known computer processors, memory units, storage devices, computer software, and other components. A high level block diagram of such a computer is illustrated in FIG. 8. Computer 84 may include a central processing unit (CPU) 86, a memory 88 and an input/output (I/O) interface 90. The computer 84 is generally coupled through the I/O interface 90 to a display 92 for visualization and various input devices 94 that enable user interaction with the computer 84 such as a keyboard, keypad, touchpad, touchscreen, mouse, speakers, buttons or any combination thereof. Support circuits may include circuits such as cache, power supplies, clock circuits, and a communications bus. The memory 88 may include random access memory (RAM), read only memory (ROM), disk drive, tape drive, etc., or a combination thereof. Embodiments of the present disclosure may be implemented as a routine 96 that is stored in memory 88 and executed by the CPU 86 to process the signal from a signal source 98. As such, the computer 84 is a general purpose computer system that becomes a specific purpose computer system when executing the routine 96. The computer 84 can communicate with one or more networks such as a local area network (LAN), a general wide area network (WAN), and/or a public network (e.g., the Internet) via a network adapter. One skilled in the art will recognize that an implementation of an actual computer could contain other components as well, and that FIG. 8 is a high level representation of some of the components of such a computer for illustrative purposes.

The computer 84 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device. Examples of well-known computing systems, environments, and/or configurations that may be suitable for use with computer 84 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some examples, the computer 84 is disposed within and considered a part of IR sensor 30 or display 92. In still other examples, the computer 84 may be co-located in both IR sensor 30 and display 92. In some examples, full 2D images of component 68, that is, composite 2D images that include all 360 degrees or some other desired portion of the external surfaces of component 68, are compiled from a plurality of individual images or exposures obtained by IR sensor 30 for subsequent inspection by a qualified NDE inspector/operator. In addition, in some examples, the computer 84 is configured to combine a plurality of images of component 68 captured by IR sensor 30, and form a composite image reflecting the image data of each of the plurality of images.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A flash thermography device for generating an infrared image of a turbine component located inside a turbine, wherein the turbine includes at least one inspection port, the flash thermography device comprising:
    an elongated borescope arranged to transmit thermal energy from a first end to a second end;
    a flash source coupled to and arranged around a perimeter of the first end of the borescope, the flash source operable to generate a light pulse that heats the turbine component, wherein the flash source has an annular shape having a central aperture that receives the borescope;
    an infrared sensor coupled to the second end of the borescope for detecting thermal energy radiated by the turbine component; and
    a lens disposed adjacent one of the first end and the second end of the borescope, wherein the first end of the borescope passes through the inspection port to position the flash source adjacent the component while the second end of the borescope including the infrared sensor remains outside of the turbine,
    and wherein thermal energy radiated from the turbine component in response to activation of the flash source is transmitted through the borescope to the infrared sensor to enable generation of the infrared image.

2. The device according to claim 1, wherein the infrared sensor is an infrared camera.

3. The device according to claim 1, wherein the turbine component is a hot gas path turbine component selected from the group consisting of a combustor, transition, vane and blade.

4. The device according to claim 1, further including an infrared filter located on the first end to enable detection of thermal energy that is in the middle infrared region of the electromagnetic spectrum.

5. The device according to claim 1, wherein a duration of the light pulse is approximately 2 to 15 milliseconds.

6. The device according to claim 5, wherein the turbine component includes a thin coating and a signal collection time for the infrared sensor is approximately 2 seconds when using a light pulse having a duration of approximately 2 seconds.

7. The device according to claim 5, wherein the turbine component includes a thick coating and a signal collection time for the infrared sensor is approximately 15 seconds when using a light pulse having a duration of approximately 15 seconds.

8. The device according to claim 1, wherein the flash source includes a plurality of sectors.

9. The device according to claim 1, wherein the borescope includes a second lens disposed adjacent the other of the first end and the second end.

10. The device according to claim 9, wherein the second lens is an objective lens.

11. A flash thermography device for generating an infrared image of a turbine component located inside a turbine, wherein the turbine includes at least one inspection port, comprising:
    a flash source that generates a light pulse that heats the turbine component, wherein the flash source has an annular shape having a central aperture;
    an infrared sensor for detecting thermal energy radiated by the turbine component;
    a borescope having a sensor end, a viewing end and an elongated hollow tube that extends between the sensor end and the viewing end, wherein the infrared sensor is coupled to the sensor end and the central aperture of the flash source receives the viewing end such that the flash source surrounds a perimeter of the viewing end, and wherein the viewing end and the flash source are positioned in the inspection port to locate the viewing end inside the turbine and wherein thermal energy radiated from the turbine component in response to receipt of the light pulse is transmitted through the elongated hollow tube to the infrared sensor to enable generation of the infrared image;

a first lens positioned within the elongated hollow tube adjacent the viewing end;

a second lens positioned within the elongated hollow tube adjacent the sensor end; and a flash power supply for energizing the flash source, the flash power supply and the infrared sensor disposed outside of the turbine.

12. The device according to claim 11, wherein the infrared sensor is an infrared camera.

13. The device according to claim 11, wherein the turbine component is a turbine airfoil.

14. The device according to claim 11, further including an infrared filter located on the viewing end to enable detection of thermal energy that is in the middle infrared region of the electromagnetic spectrum.

15. The device according to claim 11, wherein a duration of the light pulse is approximately 2 to 15 milliseconds.

16. The device according to claim 15, wherein the turbine component includes a thin coating and a signal collection time for the infrared sensor is approximately 2 seconds when using a light pulse having a duration of approximately 2 seconds.

17. The device according to claim 15, wherein the turbine component includes a thick coating and a signal collection time for the infrared sensor is approximately 15 seconds when using a light pulse having a duration of approximately 15 seconds.

18. The device according to claim 11, wherein the flash source includes a plurality of sectors.

19. The device according to claim 11, wherein the first lens and the second lens are objective lenses.

20. A method for inspecting a turbine component located inside a turbine system, wherein the turbine includes at least one inspection port, the method comprising:

providing a flash source that generates a light pulse that heats the turbine component, wherein the flash source has an annular shape having a central aperture;

providing an infrared sensor for detecting thermal energy radiated by the turbine component in response to receipt of the light pulse;

providing a borescope having a viewing end and an interior hollow that extends from the viewing end to the infrared sensor, the flash source coupled to the viewing end of the borescope;

inserting the viewing end of the borescope and the flash source into the inspection port to locate the viewing end and the flash source inside the turbine system while maintaining the infrared sensor outside of the inspection port;

transmitting thermal energy radiated from the turbine component through the hollow to the infrared sensor to enable generation of the infrared image; and inspecting a turbine characteristic.

21. The method according to claim 20, wherein the turbine characteristic is a back flow margin for a stationary or rotating component including a thermal barrier coating and/or a bond coating wherein the back flow margin is estimated soon after shutdown of the turbine system, without waiting for a cool down period thereby enabling adjustment of modulated cooling flows to improve performance for future turbine operation.

22. The method according to claim 20, wherein the turbine characteristic is an impingement pressure ratio that is estimated soon after shutdown without waiting for a cool down period.

23. The method according to claim 20, wherein inspection of the turbine characteristic provides information used to increase a firing temperature during operation of the turbine system thereby improving turbine efficiency and power output.

24. The method according to claim 20, wherein inspection of the turbine characteristic enables determination of a useful life of the turbine component without waiting for a cool down period and without removal of a turbine shell cover.

25. The method according to claim 20, wherein the turbine characteristic is a thermal barrier coating and/or bond coating thickness on the component and/or a delamination level wherein the turbine characteristic is inspected to enable prediction of whether the turbine system is able to withstand a level of chipping in the thermal barrier and/or bond coating by estimation of base metal temperature.

26. The method according to claim 20, wherein inspection of the turbine characteristic provides real time feedback to enable turbine efficiency and performance improvements.

* * * * *